March 6, 1928.
J. L. CONNORS
MOTOR CAR
Filed March 14, 1927
1,661,409
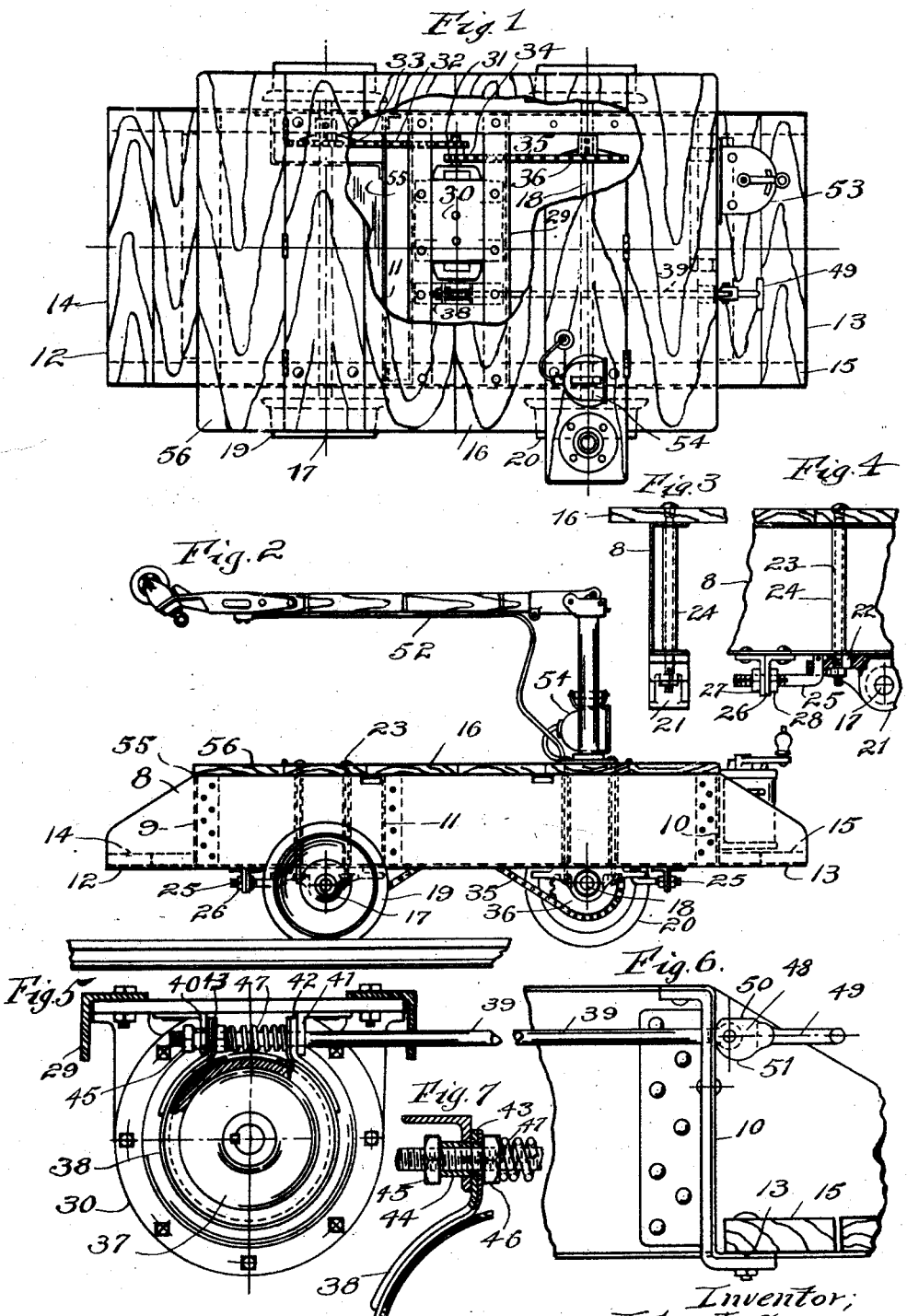

Patented Mar. 6, 1928.

1,661,409

UNITED STATES PATENT OFFICE.

JOHN L. CONNORS, OF CHICAGO, ILLINOIS, ASSIGNOR TO MORGAN-GARDNER ELECTRIC COMPANY, OF HARVEY, ILLINOIS.

MOTOR CAR.

Application filed March 14, 1927. Serial No. 175,237.

This invention relates more specifically to a motor driven car or light locomotive which is intended for use in and about mines. Coal mines are usually or frequently equipped with electric railways, electric mining machines, loading machines, and various other machines or apparatus which may require more or less expert attention so that it becomes necessary for men having the care of such machinery to go from one point to another around the mine. The present vehicle or power driven car is particularly intended to expedite such service and to provide means whereby men may quickly move from one part of the mine to another and may also carry the necessary tools and repair parts or the like.

The objects of this invention are to provide an improved light power driven car or locomotive for use in mines or the like; to provide a car of this character which is exceedingly light and which may be removed from the track or placed thereon by two men; to provide a novel form of car construction whereby the body may have sufficient inherent flexibility so that the wheels and axles may be rigidly secured thereto and so that the car will operate satisfactorily over the usual mine tracks which are frequently more or less uneven; to provide a light mine locomotive or car having a top or platform formed of wood or insulating material; to provide a light car of this character having novel operating and controlling mechanism; and to provide such other novel features of construction as will appear more fully from the following description.

In the accompanying drawings illustrating this invention;

Figure 1 is a plan view with parts broken away to show the interior construction;

Figure 2 is a side view with one of the front wheels removed;

Figures 3 and 4 are details of the frame and bearing construction; and

Figures 5, 6 and 7 are details showing the motor mounting and brake mechanism.

The vehicle frame is formed of longitudinal channel bars or plates 8 and any suitable number of cross plates, such as 9, 10 and 11, all of these frame members being preferably made of comparatively light sheet steel of approximately one-eighth of an inch in thickness. These frame members may be riveted together or may be connected by means of angle irons or the like. The end cross plates 9 and 10 are bent to provide outwardly extending lower projections 12 and 13 to provide steps or platforms at either end of the car. These platforms are preferably covered with boards, as shown at 14 and 15, and the top of the car is covered with boards or plates 16, these parts being preferably made of wood which not only provides insulation in the event that a workman on the car comes in contact with a live wire but also provides means whereby electric machinery or other devices may be conveniently transported without being injured.

The car is provided with two axles 17 and 18, and with wheels 19 and 20. The axle 17 is mounted in bearings 21 and is preferably provided with balls or rollers in order to prevent friction. The bearing blocks 21 fit against the lower flanges of the side plates or frame members 8 and are provided with slots 22 for receiving the fastening bolts 23. These bolts preferably extend through the upper and lower flanges of the side plates and also through the platform 16 and have spreader pipes 24 between the flanges so that when the bolts are tightened, the bearing blocks will be held in adjusted position and furthermore the strains will be divided between the flanges and some of the load may also be taken by the boards of the platform. These bearings may be adjusted longitudinally of the frame by means of screws 25 which pass through lugs or brackets 26 on the side plates and are held by means of adjusting nuts 27 and 28, as will be readily seen from Figures 3 and 4. The front axle 18 is adjustably mounted in the same manner as the axle 17 so that further description of its adjusting mechanism is not necessary.

Two angle bars 29 extend across the top of the frame and provide means for supporting the driving motor 30 which is secured thereto, as shown in Figures 1 and 5. The motor shaft has a sprocket 31 which drives a chain 32 passing over a sprocket 33 on the axle 17. It is also provided with a second sprocket 34 which drives a chain 35 passing over a sprocket 36 on the axle 18. By means of this arrangement both of the axles are driven and the chains may be adjusted with the axle adjusting devices heretofore described in order to keep them properly tightened.

The motor shaft is also provided with a brake wheel 37 which is engaged by a brake band 38. This band is actuated by a brake rod 39 which passes through two supports or projections 40 and 41. One end 42 of the brake band engages with the rod 39 and is adapted to bear again the projection 41. The other end 43 engages with or is secured to a sleeve 44 on the rod 39, this sleeve passing through a hole in the projection 40. Adjusting nuts 45 and 46 on the rod 39 engage with the ends of the sleeve 44 in order to adjust the sleeve and end of the brake band with respect to the rod. The ends of the band are held in brake releasing position by a spring 47, one end of which engages with the end 42 of the brake band and the other end with the nut 46 so that this spring also serves to move the brake rod 39 to the left or releasing position, as shown in Figures 5 and 6. The front end of the rod 39 passes through the frame plate 10 and is pivoted to an operating cam 48 which is actuated by a handle 49. This cam has a flat spot 50 on one side which is arranged so that when the handle is in raised position the brake will be locked. The opposite side of the cam has a projecting portion 51 so that when the lever or handle 49 is pressed downwardly, the tension on the brake may be increased to any desired degree. The motor car has the usual trolley pole 52 and suitable connections for conducting electricity from the trolley to the motor 30 and is provided with a controller 53 which is preferably of the reversible type so that the car may be fully controlled by means of one handle. The car is preferably provided with a portable lantern-type headlight 54 which is mounted with a removable plug so that an extension cord may be attached to permit the lantern to be moved to illuminate the work. A large tool box 55 is arranged at one end of the body so that the cover 56 forms a part of the platform 16.

From this description it will be seen that I provide a motor car which may be made very light and when provided with anti-friction bearings for the axles requires very little power to drive the same or to be pushed along by hand. Furthermore, the device may be driven at sufficiently high speed so that the workmen or machinists may be rapidly taken from one part of a mine to another and may take sufficient tools or parts with them for any ordinary repair job. It will be particularly noted that the flexible construction of the car body permits the axles to be attached rigidly thereto and thereby avoids the necessity of springs and also permits the car to be made very low so that it may be operated in mines having low roofs. Changes may be made in the details of construction or in the arrangement of the parts in order to adapt the motor car for different conditions or uses, and therefore I do not wish to be limited to the exact construction herein shown and described, except as specified in the following claims, in which I claim:

1. An electric motor car comprising a frame having the main longitudinal and transverse members formed of sheet steel, two pairs of wheels and axles adjustably secured directly to the frame, a motor mounted on the frame, means for driving both pairs of wheels and axles from the motor, and a covering formed of wood or the like for the top of the frame.

2. A motor car comprising a metal body having a flat wooden top deck, journal boxes slidably secured to the bottom of the body, means for adjusting said boxes longitudinally of the frame, wheels and axles mounted in said boxes, a motor mounted in the body, sprocket wheels and chains for driving the wheels and axles from the motor, a trolley having supporting means, and means for conducting electricity to the motor, and a controller for controlling the current to the motor.

3. An electric speed car of the character set forth comprising a body formed substantially of sheet metal and having a wooden top, journal boxes engaging with the lower side of the body and having slots therein, bolts passing through said slots and engaging with the body for holding the boxes in adjusted position, screws connected with said boxes and passing through projections on the body, adjusting nuts for said screws to adjust the boxes longitudinally of the body, wheels and axles mounted in said journal boxes, a motor, means for driving the wheels and axles from the motor, and means for supplying and controlling current to said motor.

4. In a motor car, the combination with a channel-shaped frame member, of a journal box having slots therein, bolts passing through said slots and through the top and bottom flanges of the channel, and spreader pipes engaging with the bolts and with said top and bottom flanges.

5. The combination with a car frame having longitudinal side channels and having a wooden top, of a journal box engaging with the bottom flange of the channel and having slots therein, bolts passing through said slots and the flanges of the channel and also through the wooden top, a projection on said channel, a screw engaging with the box and passing through said projection, and adjusting nuts on the screw which engage with the projection for adjusting the box longitudinally of the channel.

6. A motor car of the character set forth, comprising a body having longitudinal channel-shaped side members formed of sheet steel and having cross members also formed of sheet steel, the end cross members having outwardly projecting lower portions to form platforms at either end of the body, a receptacle formed in the body, a covering for the body formed of wood or the like, one portion thereof providing a cover for said receptacle, wheels and axles for supporting the body, an electric motor, means for driving the wheels and axles from the motor, a trolley pole mounted on the body, a controller mounted on the front platform, and braking means coacting with the motor for stopping or controlling the movement of the car.

JOHN L. CONNORS.